US008251813B2

(12) United States Patent
Taya

(10) Patent No.: US 8,251,813 B2
(45) Date of Patent: Aug. 28, 2012

(54) INFORMATION PROCESSING DEVICE, CONTROL METHOD FOR INFORMATION PROCESSING DEVICE, AND INFORMATION STORAGE MEDIUM

(75) Inventor: Junichi Taya, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 332 days.

(21) Appl. No.: 12/530,713

(22) PCT Filed: Dec. 11, 2007

(86) PCT No.: PCT/JP2007/073847
§ 371 (c)(1),
(2), (4) Date: Sep. 10, 2009

(87) PCT Pub. No.: WO2008/111273
PCT Pub. Date: Sep. 18, 2008

(65) Prior Publication Data
US 2010/0331080 A1    Dec. 30, 2010

(30) Foreign Application Priority Data

Mar. 12, 2007   (JP) ................................. 2007-062369

(51) Int. Cl.
*A63F 13/00*   (2006.01)
(52) U.S. Cl. ............................... 463/30; 463/36; 463/43
(58) Field of Classification Search .................... 463/30, 463/36, 43
See application file for complete search history.

(56) References Cited

U.S. PATENT DOCUMENTS

| 6,273,818 B1 * | 8/2001 | Komoto ........................... 463/31 |
| 7,374,490 B2 * | 5/2008 | Tahara et al. .................... 463/43 |
| 7,785,199 B2 * | 8/2010 | Nishimura et al. ............. 463/31 |
| 7,828,660 B2 * | 11/2010 | Kando et al. .................... 463/37 |
| 7,833,096 B2 * | 11/2010 | Sakaguchi et al. ............. 463/31 |
| 7,946,909 B2 * | 5/2011 | Neveu et al. ...................... 463/7 |

(Continued)

FOREIGN PATENT DOCUMENTS

| EP | 1 349 054 A2 | 10/2003 |
| JP | 3262677 B2 | 11/1995 |
| JP | 2006-244353 A | 9/2006 |
| JP | 2006-314349 A | 11/2006 |

OTHER PUBLICATIONS

European Search Report issued in European Application No. 07850413.1 dated Sep. 9, 2011.

*Primary Examiner* — David L Lewis
*Assistant Examiner* — Shauna-Kay Hall
(74) *Attorney, Agent, or Firm* — Sughrue Mion, PLLC

(57) ABSTRACT

To provide an information processing device for enabling a user to select their desired number of images from among a plurality of images displayed close to one another. A trajectory obtaining unit obtains a trajectory of a position, the position being designated by the user. A selection candidate image determination unit determines images, among the plurality of images, that are surrounded by the obtained trajectory. A number of times the images determined by the selection candidate image determination unit as being surrounded by the trajectory obtained by the trajectory obtaining unit are surrounded by the trajectory is obtained. An image selection unit selects the number of images, the number corresponding to the number of times obtained by a surrounding number of times obtaining unit, from among the images determined by the selection candidate image determination unit as being surrounded by the trajectory obtained by the trajectory obtaining unit.

5 Claims, 11 Drawing Sheets

U.S. PATENT DOCUMENTS

| | | | |
|---|---|---|---|
| 2002/0142843 A1* | 10/2002 | Roelofs | 463/42 |
| 2004/0070564 A1* | 4/2004 | Dawson et al. | 345/156 |
| 2004/0119763 A1 | 6/2004 | Mizobuchi et al. | |
| 2005/0093868 A1 | 5/2005 | Hinckley | |
| 2006/0258453 A1* | 11/2006 | Kando | 463/36 |
| 2008/0170752 A1 | 7/2008 | Murayama | |

* cited by examiner

INFORMATION PROCESSING DEVICE, CONTROL METHOD FOR INFORMATION PROCESSING DEVICE, AND INFORMATION STORAGE MEDIUM

TECHNICAL FIELD

The present invention relates to an information processing device, a control method for an information processing device, and an information storage medium.

BACKGROUND ART

There is known an information processing device which carries out a process, based on at least one image selected by a user from among a plurality of images shown on a display screen. Conventionally, in such an information processing device, a user points a pointing device, such as e.g., a mouse, a touch panel, an information input device disclosed in Patent Document 1, or the like, at each image among a plurality of images to thereby select at least one image from among the plurality of images.

Patent Document 1: Japanese Patent No. 3262677

DISCLOSURE OF THE INVENTION

Problems to be Solved by the Invention

However, in the above described information processing device, when a plurality of images are shown close to one another and/or shown relatively small, a user cannot readily select their desired number of (particularly two or more) images from among the plurality of images.

The present invention has been conceived in view of the above, and an object of the present invention is to provide an information processing device, a control method for an information processing device, and an information storage medium for enabling a user, when a plurality of images are shown close to one another and/or shown relatively small on a display screen, to relatively readily select their desired number of images from among the plurality of images.

Means for Solving the Problems

In order to attain the above described object, an information processing device according to the present invention is an information processing device for carrying out a process based on at least one image selected by a user from among a plurality of images displayed on a display screen, comprising trajectory obtaining means for obtaining a trajectory of a position on the display screen, the position being designated by the user; determination means for determining images among the plurality of images, the images being surrounded by the trajectory obtained by the trajectory obtaining means; surrounding number of times obtaining means for obtaining a number of times the images determined by the determination means as being surrounded by the trajectory obtained by the trajectory obtaining means are surrounded by the trajectory; and image selection means for selecting a number of images, the number corresponding to the number of times obtained by the surrounding number of times obtaining means, from among the images determined by the determination means as being surrounded by the trajectory obtained by the trajectory obtaining means.

Also, a control method for controlling an information processing device according to the present invention is a control method for controlling an information processing device for carrying out a process based on at least one image selected by a user from among a plurality of images displayed on a display screen, the control method comprising a trajectory obtaining step of obtaining a trajectory of a position on the display screen, the position being designated by the user; a determination step of determining images among the plurality of images, the images being surrounded by the trajectory obtained at the trajectory obtaining step; a surrounding number of times obtaining step of obtaining a number of times the images determined at the determination step as being surrounded by the trajectory obtained at the trajectory obtaining step are surrounded by the trajectory; and an image selecting step of selecting a number of images, the number corresponding to the number of times obtained at the surrounding number of times obtaining step, from among the images determined at the determination step as being surrounded by the trajectory obtained at the trajectory obtaining step.

Also, a program according to the present invention is a program for causing a computer, such as a personal computer, a consumer game device, a portable game device, a commercial game device, a portable phone, a personal digital assistant (PDA), and the like, to function as an information processing device for carrying out a process based on at least one image selected by a user from among a plurality of images displayed on a display screen, the program causing the computer to functioning as trajectory obtaining means for obtaining a trajectory of a position on the display screen, the position being designated by the user; determination means for determining images among the plurality of images, the images being surrounded by the trajectory obtained by the trajectory obtaining means; surrounding number of times obtaining means for obtaining a number of times the images determined by the determination means as being surrounded by the trajectory obtained by the trajectory obtaining means are surrounded by the trajectory; and image selection means for selecting a number of images, the number corresponding to the number of times obtained by the surrounding number of times obtaining means, from among the images determined by the determination means as being surrounded by the trajectory obtained by the trajectory obtaining means.

An information storage medium according to the present invention is a computer readable information storage medium storing the above described program. A program distribution device according to the present invention is a program distribution device having the information storage medium storing the above described program and for reading the above described program from the information storage medium, and distributing the read program. A program distribution method according to the present invention is a program distribution method for reading the program from the information storage medium storing the above described program, and distributing the read program.

The present invention relates to an information processing device for carrying out a process based on at least one image selected by a user from among a plurality of images displayed on a display screen. According to the present invention, a trajectory of a position designated by a user on the display screen is obtained, and images surrounded by the above-describe trajectory, among the plurality of images, are determined. In addition, the number of times the images determined as being surrounded by the above-described trajectory are surrounded by the trajectory is obtained. Further, the number of images, the number corresponding to the above-described number of times, are selected from among the images determined as being surrounded by the trajectory. According to the present invention, even in a case in which a plurality of images are displayed close to one another and/or shown relatively small, a user can relatively readily select their desired number of images from among the plurality of images.

According to one aspect of the present invention, the image selection means may select the number of images, the number corresponding to the number of times obtained by the surrounding number of times obtaining means, from among the images determined by the determination means as being surrounded by the trajectory obtained by the trajectory obtaining means, based on a start position or an end position of the trajectory obtained by the trajectory obtaining means and positions of the images determined by the determination means as being surrounded by the trajectory obtained by the trajectory obtaining means.

Also, according to one aspect of the present invention, the image selection means may select the number of images, the number corresponding to the number of times obtained by the surrounding number of times obtaining means, from among the images determined by the determination means as being surrounded by the trajectory obtained by the trajectory obtaining means, beginning with an image having the shortest distance from the start position or the end position of the trajectory obtained by the trajectory obtaining means.

BEST MODE FOR CARRYING OUT THE INVENTION

In the following, one example of an embodiment of the present invention will be described in detail, based on the accompanying drawings. Here, an example in which the present invention is applied to a game device which is one embodiment of an information processing device will be described. A game device according to an embodiment of the present invention is realized, using, e.g., a consumer game device, a portable game device, a portable phone, a personal digital assistant (PDA), a personal computer, or the like. Here, a case in which a consumer game device is used to realize a game device according to an embodiment of the present invention will be described.

Figure 1:
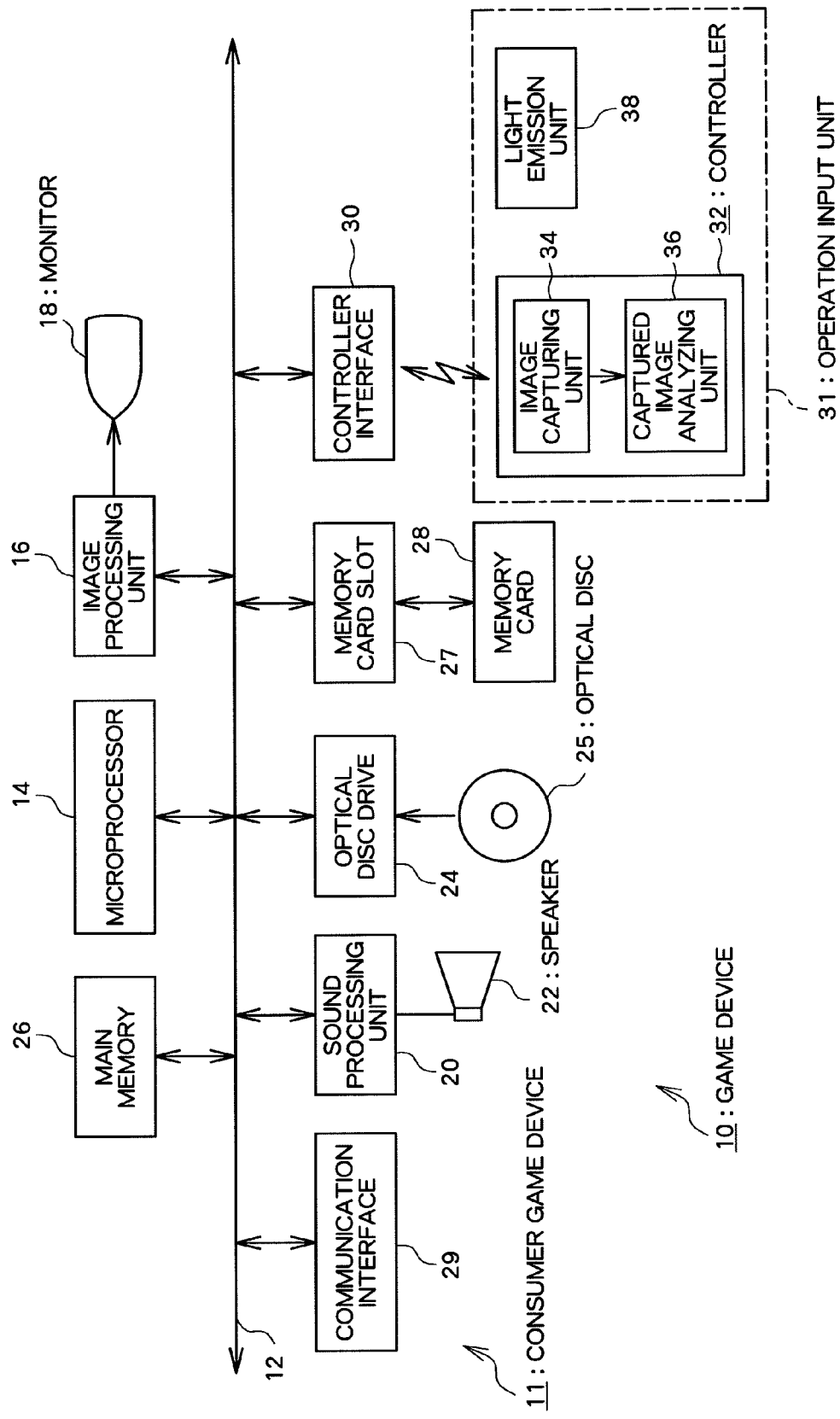
FIG. 1 is a diagram showing a hardware structure of a game device according to this embodiment.

FIG. 1 is a diagram showing a structure of a game device according to an embodiment of the present invention. The game device 10 shown in FIG. 1 comprises a consumer game device 11, an optical disc 25, a memory card 28, a monitor 18, and a speaker 22. The optical disc 25 and the memory card 28 are information storage media, and mounted in the game device 11. The monitor 18 and the speaker 22 are connected to the consumer game device 11. As the optical disc 25, e.g., a CD-ROM, a DVD-ROM, and so forth are used. As the monitor 18, e.g., a home-use television set receiver is used. As the speaker 22, e.g., a built-in speaker in a home-use television set receiver is used.

The consumer game device 11 is a publicly known computer game system, and comprises a bus 12, a microprocessor 14, an image processing unit 16, a sound processing unit 20, an optical disc drive 24, a memory card slot 27, a communication interface (I/F) 29, a controller interface (I/F) 30, and an operation input unit 31. Structural elements other than the operation input unit 31 are accommodated in the enclosure of the consumer game device 11.

The bus 12 is used to exchange an address and data among the respective units of the consumer game device 11. The microprocessor 14, image processing unit 16, sound processing unit 20, optical disc drive 24, main memory 26, memory card slot 27, communication interface 29, and controller interface 30 are connected via the bus 12 for data exchange.

The microprocessor 14 controls the respective units of the consumer game device 11, based on an operating system stored in a ROM (not shown) and a program and data read from the optical disc 25 or the memory card 28. The main memory 26 comprises, e.g., a RAM. A program and data read from the optical disc 25 or the memory card 28 is written into the main memory 26 when necessary. The main memory 26 is used also as a working memory of the microprocessor 14.

The image processing unit 16 includes a VRAM, and renders a game screen image into the VRAM, based on the image data sent from the microprocessor 14. The image processing unit 16 converts the game screen image into a video signal and outputs the resultant video signal at a predetermined time to the monitor 18. The sound processing unit 20 comprises a sound buffer, where various sound data, such as game music, game sound effect, message, and so forth, read from the optical disc 25 are to be stored. The sound processing unit 20 reproduces the various sound data stored in the sound buffer and outputs via the speaker 22.

The optical disc drive 24 reads a program and data recorded in the optical disc 25 according to an instruction from the microprocessor 14. Note that although an optical disc 25 is used here to supply a program and data to the consumer game device 11, any other information storage medium, such as, e.g., a ROM card or the like, may be used instead. Alternatively, a program and data may be supplied via a communication network, such as the Internet or the like, from a remote place to the consumer game device 11.

The memory card slot 27 is an interface for mounting the memory card 28. The memory card 28 comprises a nonvolatile memory (e.g., EEPROM or the like), and is used to store various game data, such as e.g., save data and so forth. The communication interface 29 is an interface for connection for communication to a data network, such as the Internet or the like.

The controller interface 30 is an interface for connecting a plurality of controllers 32 by radio. As a controller interface 30, e.g., an interface according to, e.g., Bluetooth interface standard can be used. Note that the controller interface 30 may be an interface for connecting the controller 32 in a wired manner.

Figure 2:
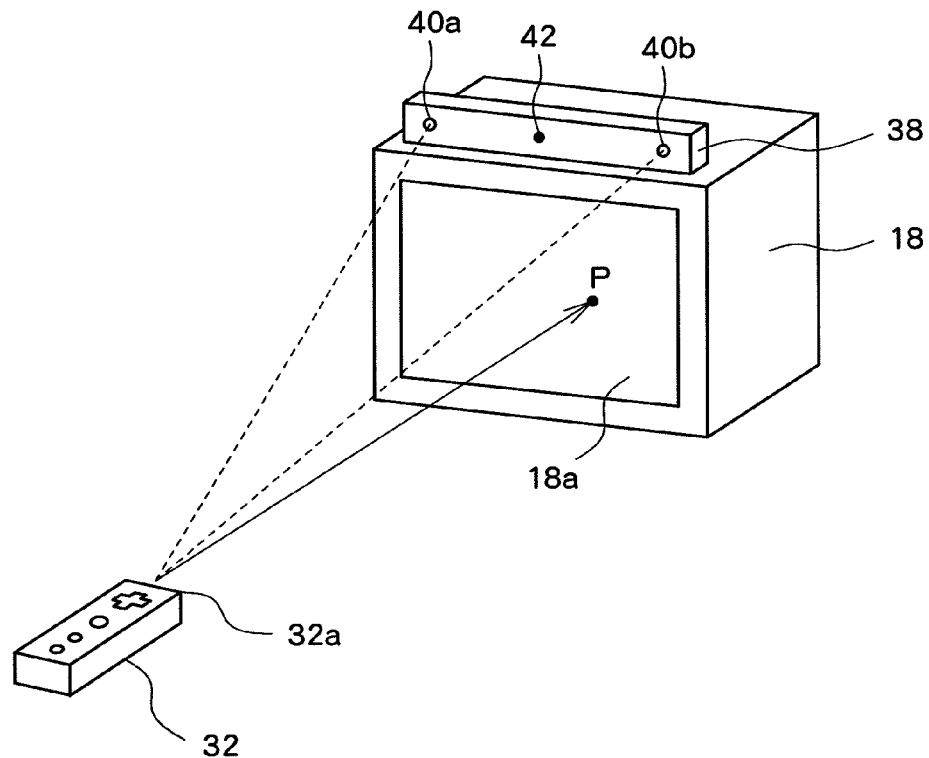
FIG. 2 is a diagram showing one example of an operation input unit.
Figure 3:
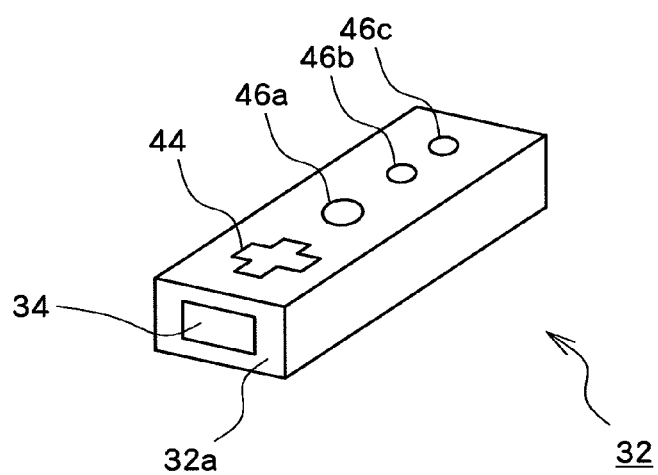
FIG. 3 is a diagram showing one example of a controller.

The operation input unit 31 is used by a user to input operation. The operation input unit 31 has a function as a pointing device for use by a user to point to a position on a game screen image shown on the monitor 18. As the function of the operation input unit 31, a technique, such as is disclosed in, e.g., JP3262677B can be used. The operation input unit 31 comprises one or more controllers 32 and one light emission unit 38. Each controller 32 comprises an image capturing unit 34 and a captured image analyzing unit 36. FIG. 2 is a diagram showing one example of the operation input unit 31. FIG. 3 is a diagram showing one example of the controller 32.

As shown in FIG. 2, the light emission unit 38 is provided on the upper portion of the monitor 18. However, the light emission unit 38 may be provided on the lower portion of the monitor 18 instead. The light emission unit 38 has a plurality of light sources. In the example shown in FIG. 2, light sources 40a, 40b are provided on the respective ends of the light emission unit 38. As shown in FIG. 3, a direction button 44 and buttons 46a, 46b, 46c are provided on the surface of the controller 32. The direction button 44 has a cross shape and is generally used to designate a direction in which to move a character or a cursor. The buttons 46a, 46b, 46c are used for various game operations. An image capturing unit 34, that is, an image capturing element, such as, e.g., a CCD or the like, is provided on one lateral surface of the controller 32. The controller 32 incorporates a captured image analyzing unit 36, such as, e.g., a microprocessor or the like. Note that the lateral surface where the image capturing unit 34 is provided is hereinafter referred to as a "front end 32a of the controller 32".

When a user directs the front end 32a of the controller 32 at the monitor 18, the light sources 40a, 40b are shown in an image captured by the image capturing unit 34. The captured image analyzing unit 36 analyzes the positions of the light sources 40a, 40b shown in the image captured by the image capturing unit 34, and obtains the position and inclination of the controller 32, based on the analysis result. More specifically, the captured image analyzing unit 36 calculates the relative position of the controller 32 relative to a predetermined reference position 42 and the inclination angle of the controller 32 relative to the straight line connecting the light source 40a and the light source 40b. While information describing the positional relationship between the reference position 42 and the game screen 18a of the monitor 18 is stored in the game device 10, screen coordinate values of the position P pointed to by the front end 32a of the controller 32 are obtained, based on the information stored and the position and inclination of the controller 32, obtained by the captured image analyzing unit 36.

Figure 4:
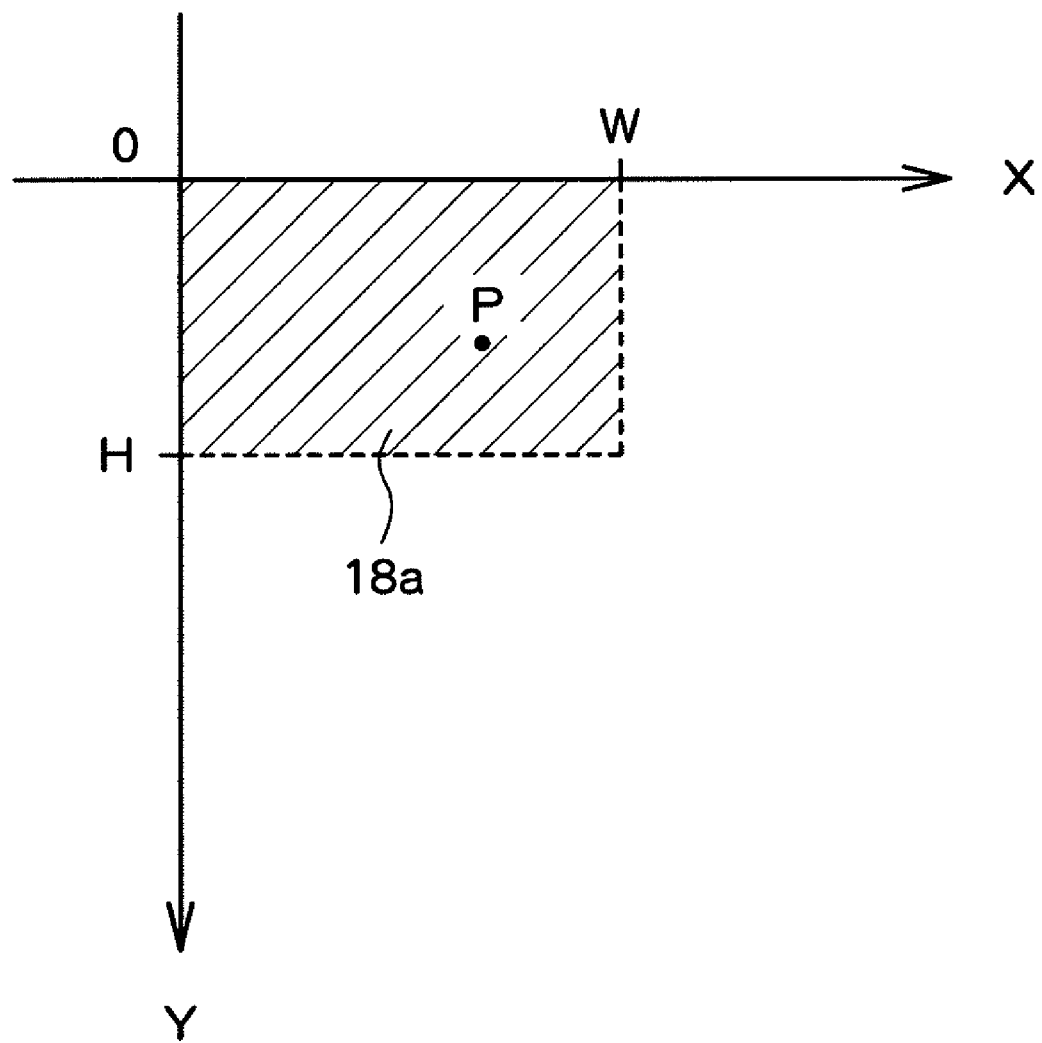
FIG. 4 is a diagram showing a screen coordinate system.

Here, note that "a screen coordinate value" refers to a coordinate value in a screen coordinate system, and "a screen coordinate system" refers to a coordinate system, as shown in FIG. 4, having the origin at the left upper corner of the game screen 18a, the X axial positive direction corresponding to the rightward direction of the game screen 18a, and the Y axial positive direction corresponding to the downward direction of the game screen 18a. As shown in FIG. 4, a predetermined area in the screen coordinate system, that is, an area satisfying the condition "$0 \leq X \leq W$, and $0 \leq Y \leq H$" (the area indicated by the diagonal lines) corresponds to the area shown on the monitor 18. In the above, "W" refers to the width of the game screen 18a, and "H" refers to the height of the same.

The position P pointed to by the front end 32a of the controller 32 is referred to as a "position designated by the controller 32". Information describing the position and inclination of the controller 32, obtained by the captured image analyzing unit 36, that is information specifying the screen coordinate values of a position designated by the controller 32, is referred to as "pointing information".

The controller 32 sends to the controller interface 30 an operational signal describing the state of operation of the controller 32 every constant cycle (e.g., every $\frac{1}{60}^{th}$ of a second). The operational signal includes, e.g., identification information identifying the controller 32, the above-described pointing information, and information indicating whether or not each button is being pressed. The controller interface 30 forwards the operational signal received from the controller 32 to the microprocessor 14 via the bus 12. The microprocessor 14 determines a game operation carried out on each controller 32, based on the operational signal. For example, the microprocessor 14 determines a position designated by the controller 32, based on the operational signal (pointing information). Also, for example, the microprocessor 14 determines, based on the operational signal, whether or not any of the direction button 44 and the buttons 46a, 46b, 46c on a respective controller 32 have been pressed.

In the game device 10 having the above described structure, for example, a soccer game which imitates a soccer match to be played by an operating team of a user (hereinafter referred to as a user team) and an opponent team is carried out. This soccer game is realized by carrying out a program read from the optical disc 25.

Figure 5:
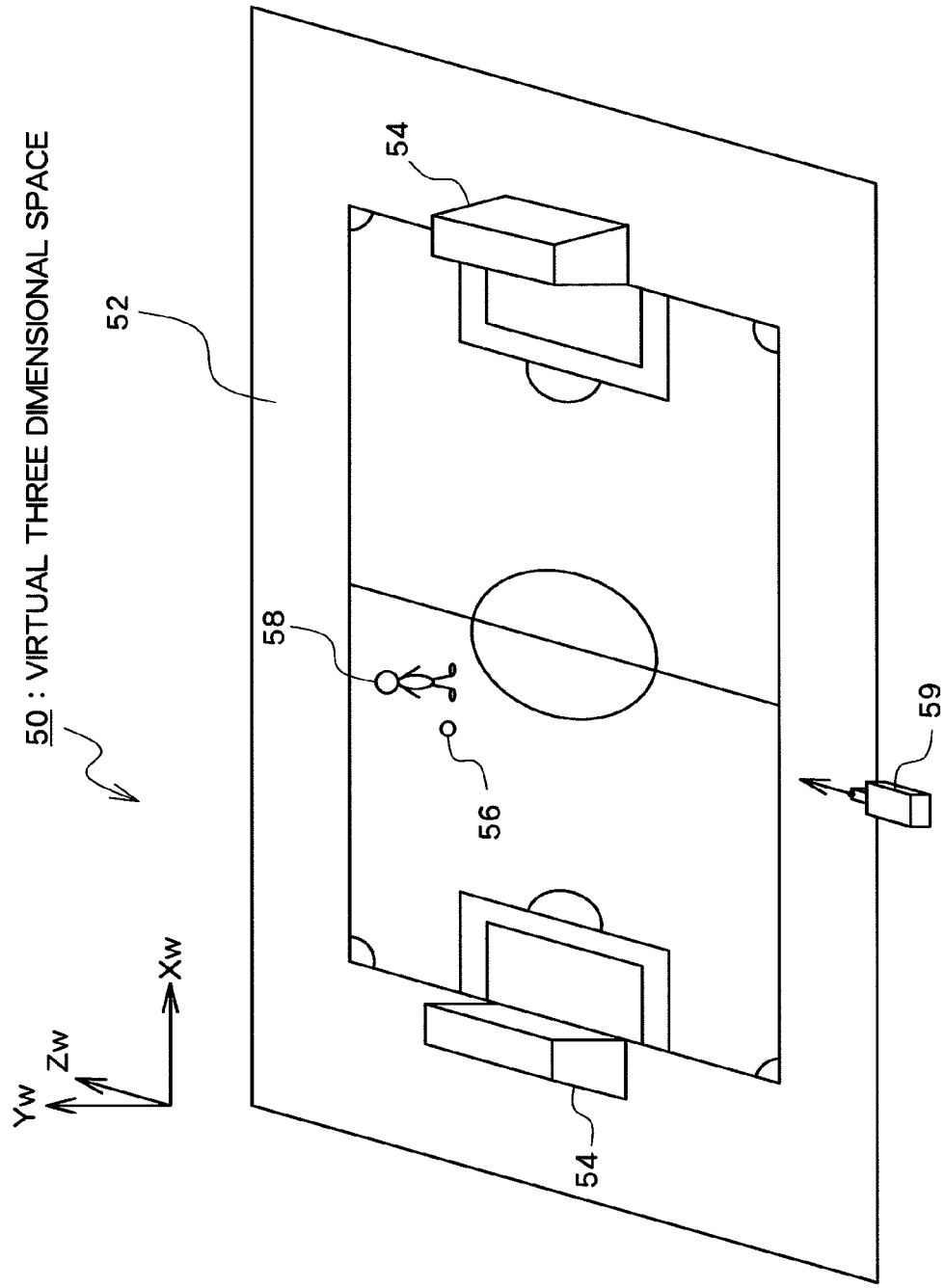
FIG. 5 is a diagram showing one example of a virtual three dimensional space.

A virtual three dimensional space (a game space) is created in the main memory 26 of the game device 10. FIG. 5 shows one example of the virtual three dimensional space. As shown in FIG. 5, a field object 52 representative of a soccer field and goal objects 54 representative of goals are placed in the virtual three dimensional space 50, thereby forming a soccer game pitch. A ball object 56 representative of a soccer ball and a player object 58 representative of a soccer player are placed on the field object 52. Although not shown in FIG. 5, eleven player objects 58 for the user team and eleven player objects 58 for the opponent team are placed on the field object 52.

A virtual camera 59 (a viewpoint and a viewing direction) is set in the virtual three dimensional space 50. The virtual camera 59 moves according to, e.g., the ball object 56 moving. A picture obtained by viewing the virtual three dimensional space 50 from the virtual camera 59 is displayed on the game screen 18a.

Figure 6:
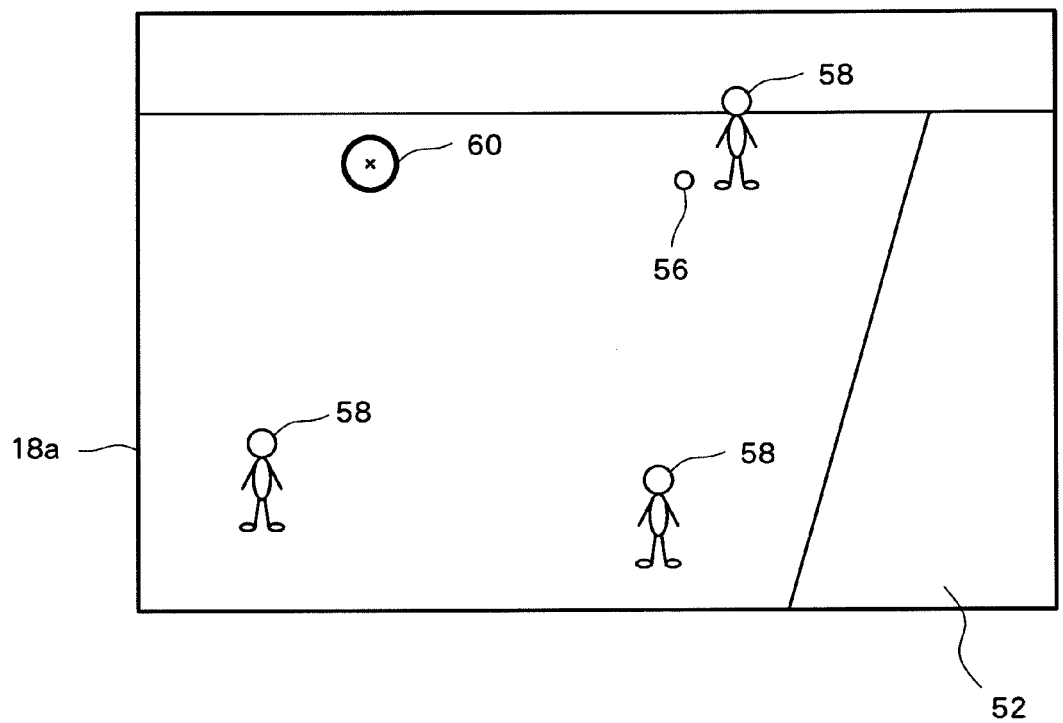
FIG. 6 is a diagram showing one example of a game screen image.

FIG. 6 shows one example of an image shown on the game screen 18a. As shown in FIG. 6, an image showing a picture obtained by viewing the virtual three dimensional space 50 from the virtual camera 59 is shown on the game screen 18a. In addition, a cursor 60 indicating a position designated by the controller 32 used by a user is shown on the game screen 18a. In this embodiment, a round cursor 60 is shown, though the cursor 60 may have any other shape.

In this soccer game, a user designates a direction in which to move (a movement direction) the player object 58, or an operation target, by pointing the front end 32a of the controller 32 at the direction. Then, the player object 58 operated by the user moves toward the position on the field object 52, corresponding to the position where the cursor 60 is displayed.

In addition, a user designates a direction (a kick direction) in which the player object 58 kicks the ball object 56 by pointing the front end 32a of the controller 32 in the direction.

For example, when a user presses a kick instruction button (the button 46a in this embodiment) with the player object 58 operated by the user, keeping the ball object 56, the player object 58 kicks the ball object 58 toward the position on the field object 52, corresponding to the position where the cursor 60 is displayed. That is, for example, when a user presses the kick instruction button with the cursor 60 located on another player object 58, the ball object 58 is kicked toward that player object 58.

Figure 7:
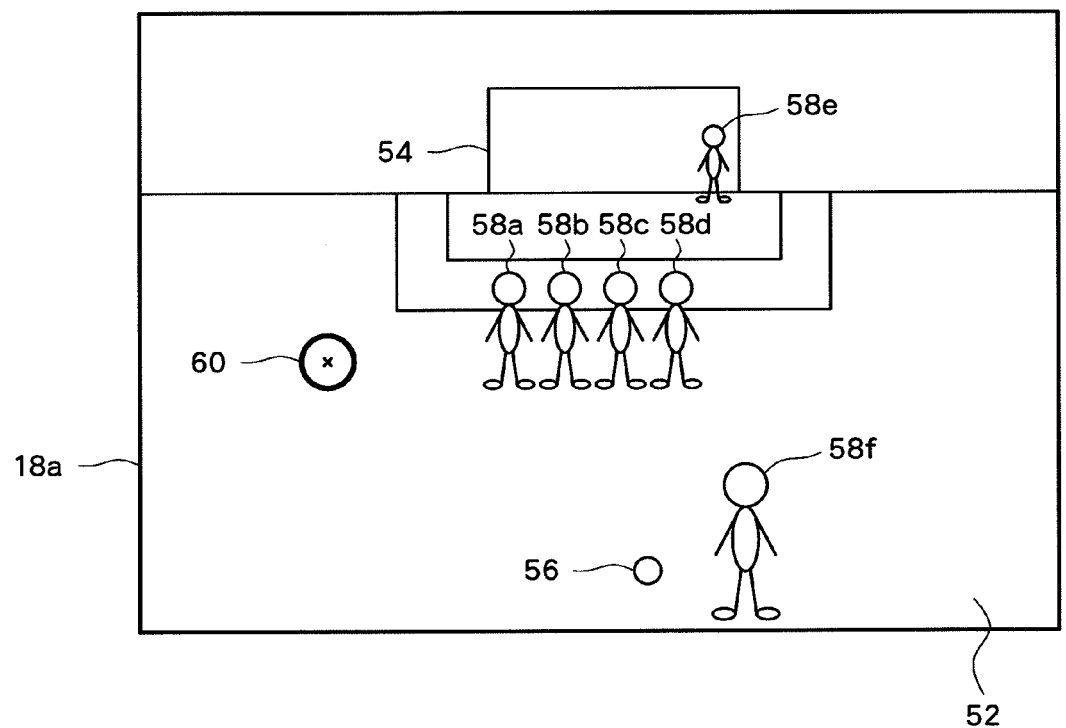
FIG. 7 is a diagram showing one example of a game screen image.

FIG. 7 shows another example of an image shown on the game screen 18a. The image shown on the game screen 18a shown in FIG. 7 corresponds to a scene in which a player object 58f of the opponent team strikes a free kick. In FIG. 7, the player objects 58a to 58e belong to the user team. Here, a plurality of player objects 58a to 58d are aligned side by side, thereby forming a so-called "wall". The player object 58f belongs to the opponent team and is a kicker to strike a free kick.

In a free kick scene for the opponent team, a user can select at least one player object out of the player objects 58a to 58d forming the "wall", and in order to block the free kick, move the player object 58 toward the kicker at the same time when the free kicker kicks the ball object 56.

Figure 8:
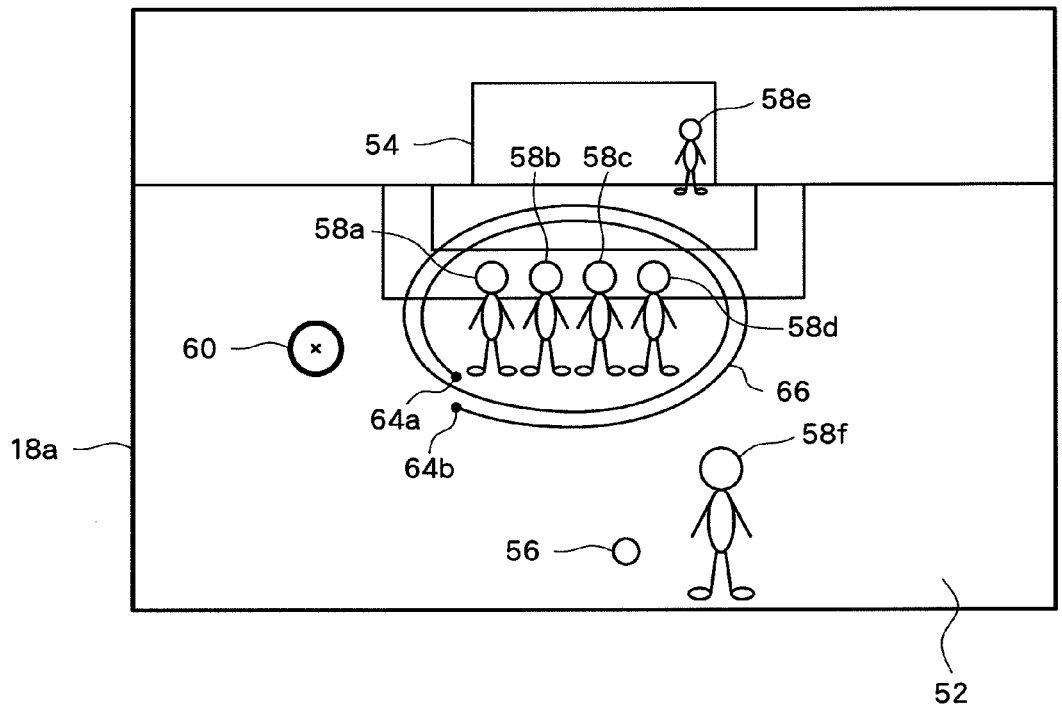
FIG. 8 is a diagram explaining a player object selection operation.

In the above, the user can select their desired player object 58 out of the plurality of player objects 58a to 58d forming the "wall" as follows. FIG. 8 is a diagram explaining selection of a player object 58. Assume a case in which a user selects, e.g., two player objects 58a, 58b in the image shown on the game screen 18a shown in FIG. 7. In this case, initially, a user moves the cursor 60 to a position near the player object 58a, and then moves the cursor 60 so as to surround the plurality of player objects 58a to 58d forming the "wall" twice, while continuously pressing the trajectory input button (the button 46b in this embodiment). That is, the user inputs a trajectory 66 which surrounds the plurality of player objects 58a to 58d forming the "wall" twice, while pressing the trajectory input button. Thereafter, the user releases the pressed trajectory input button. Note that the position 64a in FIG. 8 indicates a position designated by the controller 32 (the position of the cursor 60) when the trajectory input button has started to be pressed, and the position 64b indicates a position designated by the controller 32 (the position of the cursor 60) when the pressed trajectory input button is released.

With input of the trajectory 66 having a finite length from the position 64a to the position 64a, as shown in FIG. 8, the number of player objects 68, the number being equal to the number of times the trajectory 66 surrounds the player objects 58a to 58d, are selected from among the plurality of player objects 58a to 58b surrounded by the trajectory 66, beginning with one located closest to the position 64a (the start position). In the example shown in FIG. 8, two player objects 58a, 58b are selected. Then, the two selected player objects 58a, 58b move forward at the same time when the free kicker kicks the ball object 56.

As described above, in the game device 10, a user moves the cursor 60 so as to surround a plurality of player objects 58a to 58d using the trajectory of the cursor, and designate, using the number of times the trajectory surrounds the player object 58, the number of player objects 58 to select from among the plurality of player objects 58a to 58d. In addition, the user designates their desired player object 58 among the plurality of player object 58a to 58d, utilizing the start position of the trajectory surrounding the plurality of player objects 58a to 58d.

As a method for a user selecting their desired player object 58 from among the plurality of player objects 58a to 58d forming the "wall", there is available a method according to which the user presses a predetermined selection button (e.g., the button 46b) while pointing the controller 32 at their desired player object 58, to thereby select the player object 58. However, according to this method, a user may not be able to readily select a plurality of player objects 58 from among the plurality of player objects 58a to 58d. For example, when the plurality of player objects 58a to 58d forming the "wall" are located close to one another, the user may not be able to correctly point to their desired player object 58. Also, for example, in the case where the virtual camera 59 is located far from the player objects 58a to 58d and therefore the player objects 58a to 58d are shown relatively small on the game screen 18a, a user may not be able to correctly point to their desired player object 58. In particular, in selection of a second or thereafter player object 58, a user may press the selection button while pointing to a player object 58 already selected. In such a case, a case may result in which although the user believes that they have selected two player objects 58, only one player object 58 is actually selected. Regarding this point, in the game device 10, the number of player objects 58, the number corresponding to the number of times a trajectory surrounds the player object 58, is selected from among the plurality of player objects 58 surrounded by the trajectory. This makes it relatively easier for a user to select their desired number of player objects 58 even when the plurality of player objects 58 are located close to one another or shown small on the game screen 18a.

In the following, a structure for realizing a method for selecting one or more player objects 58 in the game device 10 will be described.

Figure 9:
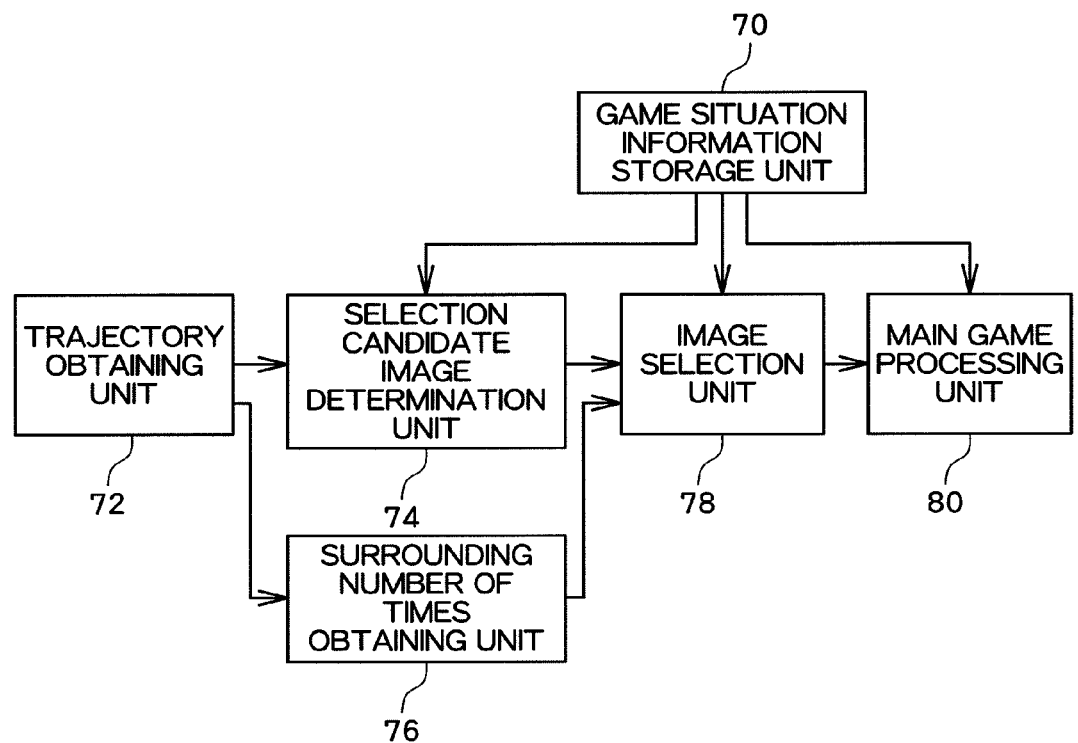
FIG. 9 is a functional block diagram of a game device according to this embodiment.

Initially, a function realized in the game device 10 will be described. FIG. 9 is a functional block diagram mainly showing a function according to the present invention among those realized in the game device 10. As shown in FIG. 9, the game device 10 functionally comprises a game situation information storage unit 70, a trajectory obtaining unit 72, a selection candidate image determination unit 74 (determination means), a surrounding number of times obtaining unit 76, an image selection unit 78, and a main game processing unit 80. These function blocks are realized by the microprocessor 14 by carrying out a program read from the optical disc 25.

The game situation information storage unit 70 is realized mainly using the main memory 26. The game situation information storage unit 70 stores game situation information describing situation in a game. The game situation information storage unit 70 stores information describing, e.g., a position where the cursor 60 is displayed. In addition, the game situation information storage unit 70 stores information describing, e.g., status (a position, posture, and so forth) of each object (the ball object 56, the player object 58, and so forth) placed in the virtual three dimensional space 50. Further, the game situation information storage unit 70 stores information describing, e.g., a position where the player object 58 is displayed on the game screen 18a. Note that the display position of the player object 58 on the game screen 18a is obtained by applying a predetermined matrix operation to the position of the player object 58 in the virtual three dimensional space 50, based on the position, orientation (a viewing direction), and an angle of view of the virtual camera 59. Further, an image shown on the game screen 18a is produced, based on the game situation information stored in the game situation information storage unit 70.

The trajectory obtaining unit 72 is realized mainly using the microprocessor 14 and the main memory 26. The trajectory obtaining unit 72 obtains a finite trajectory formed by a position on the game screen 18a, designated by a user. In this embodiment, the trajectory obtaining unit 72 obtains the trajectory 66 of a position designated by the controller 32 with the trajectory input button kept pressed. That is, the trajectory obtaining unit 72 obtains a string of positions designated by the controller 32, the position being obtained every predetermined period of time ($\frac{1}{60}^{th}$ of a second in this embodiment), with the trajectory input button kept pressed. With the pressed trajectory input button released, data on the trajectory 66 formed by a position designated by the controller 32 with the trajectory input button kept pressed is stored in the trajectory obtaining unit 72.

Figure 10:
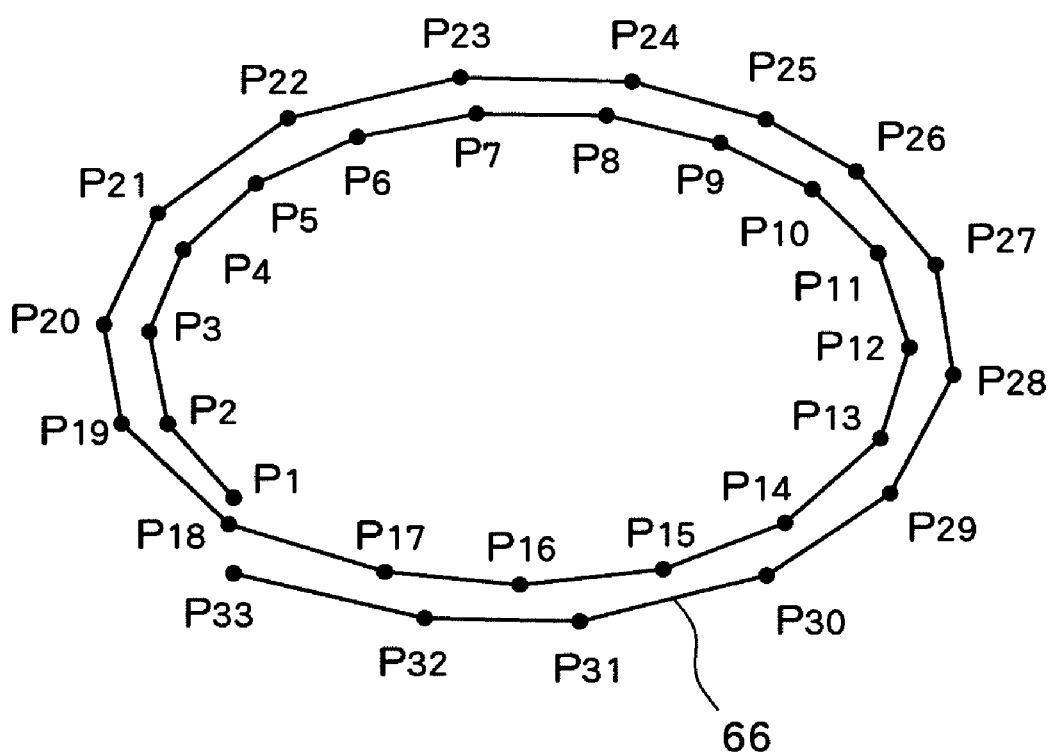
FIG. 10 is a diagram showing one example of data of a trajectory of a position designated by the controller.

FIG. 10 is a diagram explaining data of the trajectory 66. As shown in FIG. 10, data of the trajectory 66 includes a plurality of positional coordinates (positional coordinates $P_1$ to $P_{33}$ here) on the trajectory 66. Note that in FIG. 8, the positional coordinate $P_1$ refers to start positional coordinates. Start positional coordinates represent a position designated by the controller 32 when the trajectory input button is begun being pressed. The positional coordinate $P_{33}$ refers to end positional coordinates. End positional coordinates represent a position designated by the controller 32 when the pressed trajectory input button is released. Note that, in the following, for example, in the trajectory 66 shown in FIG. 10, the trajectory portion from the positional coordinate $P_1$ to the positional coordinate $P_{18}$ is referred to as a first-round trajectory portion, and the trajectory portion from the positional coordinate $P_{18}$ to the positional coordinate $P_{33}$ is referred to as a second-round trajectory portion.

The selection candidate image determination unit 74 is realized mainly using the microprocessor 14 and the main memory 26. The selection candidate image determination unit 74 determines one or more player objects 58 surrounded by the trajectory obtained by the trajectory obtaining unit 72 among the plurality of player objects 58 (a plurality of images) belonging to the user team, and determines one or more player objects 58 surrounded by the trajectory obtained by the trajectory obtaining unit 72 as one or more selection candidate player objects.

The surrounding number of times obtaining unit 76 is realized mainly using the microprocessor 14 and the main memory 26. The surrounding number of times obtaining unit 76 obtains the number of times one or more player objects 58 (one or more selection candidate player objects), which are determined by the selection candidate image determination unit 74 as being surrounded by the trajectory obtained by the trajectory obtaining unit 72, are surrounded by the trajectory.

The image selection unit 78 is realized mainly using the microprocessor 14 and the main memory 26. The image selection unit 78 selects the number of player objects 58, the number corresponding to the number of times obtained by the surrounding number of times obtaining unit 76, from among the selection candidate player objects. For example, the image selection unit 78 selects the number of player objects 58, the number being equal to the number of times obtained by the surrounding number of times obtaining unit 76, from among the selection candidate player objects.

Note that the image selection unit 78 may store data correlating the number of times obtained by the surrounding number of times obtaining unit 76 to information about the number of player objects 58 selected. Then, the image selection unit 78 may determine the number of player objects 58, the number corresponding to the number of times obtained by the surrounding number of times obtaining unit 76, based on the above-described data. Here, the above-described data may be table-type data or formula-type data.

For example, the above-described data may be set such that the number of player objects selected by the image selection unit 78 is proportional or inversely proportional to the number of times obtained by the surrounding number of times obtaining unit 76.

Also, for example, in the above-described data, "information about the number of player objects 58 selected" may be information describing a difference between the number of player objects 58 surrounded by the trajectory obtained by the trajectory obtaining unit 72 and the number of player objects 58 selected by the image selection unit 78. In this case, in the above-described data, the "information about the number of player objects 58 selected" may be set such that increase of the number of times obtained by the surrounding number of times obtaining unit 76 results in decrease of the number of player objects 58 selected by the image selection unit 78. Assume a case in which, e.g., four player objects 58 are surrounded by the trajectory obtained by the trajectory obtaining unit 72. In this case, when the number of times obtained by the surrounding number of times obtaining unit 76 is once, all of the four player objects 58 may be selected by the image selection unit 78. Alternatively, when the number of times obtained by the surrounding number of times obtaining unit 76 is twice, three player objects 58, that is, fewer by one than four player objects 58, may be selected by the image selection unit 78. Further, when the number of times obtained by the surrounding number of times obtaining unit 76 is three times, two player objects 58, that is, fewer by two than four player objects 58, may be selected by the image selection unit 78.

When the number of times obtained by the surrounding number of times obtaining unit 76 is equal to or larger than a predetermined number of times, the image selection unit 78 may select all of the player objects 58 surrounded by the trajectory obtained by the trajectory obtaining unit 72. For example, when the number of times obtained by the surrounding number of times obtaining unit 76 is three times or more, the image selection unit 78 may select all of the player objects 58 surrounded by the trajectory obtained by the trajectory obtaining unit 72, irrespective of the number of player objects 58 surrounded by the trajectory obtained by the trajectory obtaining unit 72.

Further, the image selection unit 78 selects one or more player objects 58, based on the start position of the trajectory 66 obtained by the trajectory obtaining unit 72 and the positions of the respective selection candidate players. For example, the image selection unit 78 selects the number of player objects 58, the number corresponding to the number of times obtained by the surrounding number of times obtaining unit 76, from among the selection candidate player objects, beginning with one located closest to the start position of the trajectory 66 obtained by the trajectory obtaining unit 72.

Note that the image selection unit 78 may select one or more player objects 58, based on the end position of the trajectory 66 obtained by the trajectory obtaining unit 72 and the positions of the respective selection candidate players. For example, the image selection unit 78 selects the number of player objects 58, the number corresponding to the number of times obtained by the surrounding number of times obtaining unit 76, from among the selection candidate player objects, beginning with one located closest to the end position of the trajectory 66 obtained by the trajectory obtaining unit 72. Further, the image selection unit 78 may select the number of player objects 58, the number corresponding to the number of times obtained by the surrounding number of times obtaining unit 76, from among the selection candidate player objects, based on a random number.

The main game processing unit 80 is realized mainly using the microprocessor 14 and the main memory 26. The main game processing unit 80 carries out a game process to thereby update the game situation information stored in the game situation information storage unit 70. For example, the main game processing unit 80 carries out a game process, based on the one or more player objects 58 selected by the image selection unit 78. For example, in a free kick scene for the opponent team, the main game processing unit 80 moves the one or more player objects 58 selected by the image selection unit 78 toward the kicker at the same time when the free kicker kicks the ball object 56.

Figure 11:
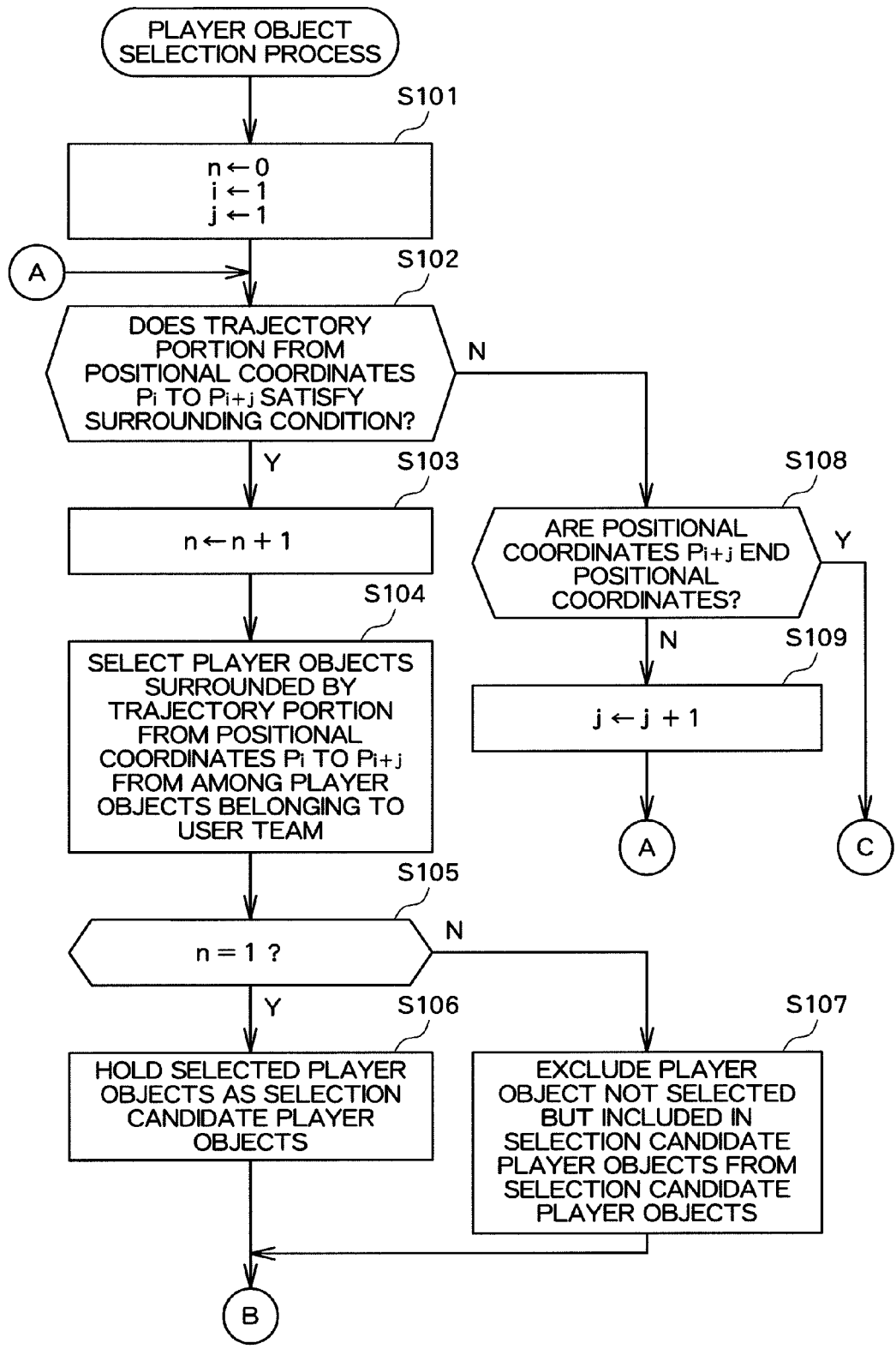
FIG. 11 is a flowchart of a process to be carried out in the game device.
Figure 12:
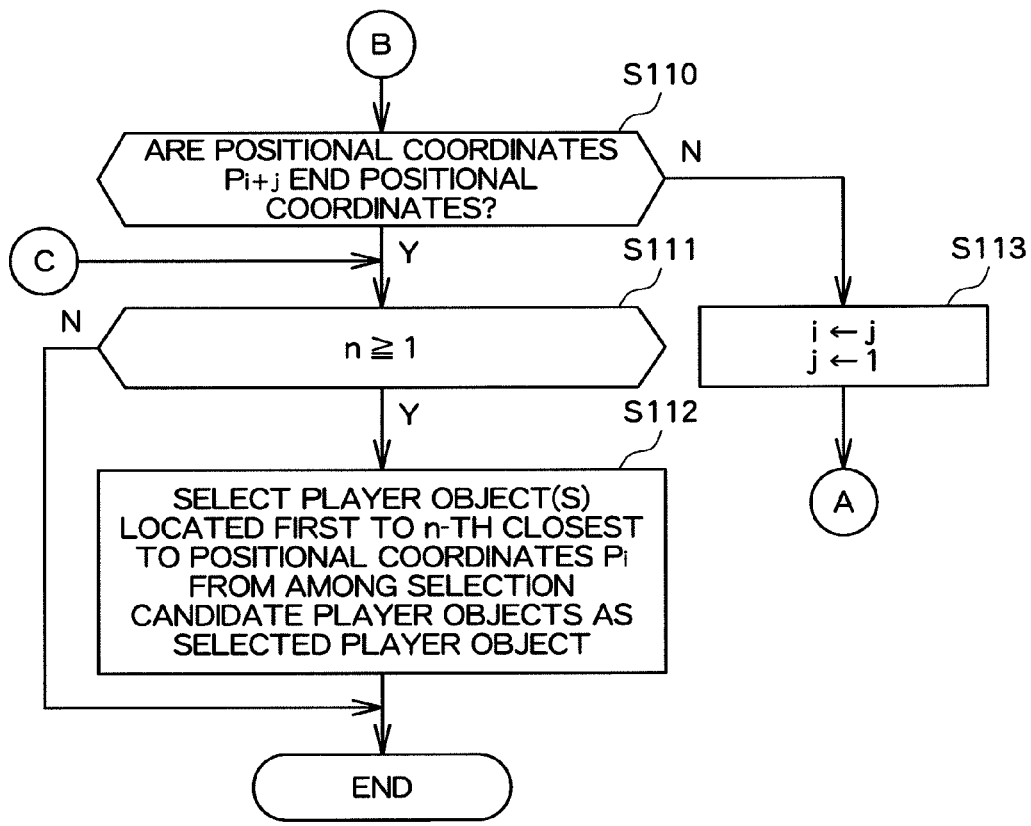
FIG. 12 is a flowchart of a process to be carried out in the game device.

In the following, a process to be carried out in the game device 10 will be described. FIGS. 11 and 12 are flowcharts of a process for selecting one or more player objects 58, the process being carried out in a free kick scene for the opponent team. The process shown in FIGS. 11 and 12 is carried out at a time when the pressed trajectory input button is released. As described above, when the pressed trajectory input button is released, data of the trajectory 66, such as is shown in FIG. 10, is stored. The process shown in FIGS. 11 and 12 is carried out based on the data.

As shown in FIG. 11, initially, the game device 10 initializes the variables n, i, j (S101), in which the variable n is initialized to 0 and the variables i, j are initialized to 1. Thereafter, the game device 10 (the surrounding number of times obtaining unit 76) determines whether or not the portion of the trajectory 66 between the positional coordinate $P_i$ and the positional coordinate $P_{i+j}$ satisfies a surrounding condition (S102). The positional coordinate $P_i$ is the $i^{th}$ positional coordinate on the trajectory 66, and the positional coordinate $P_{i+j}$ is the $i+j^{th}$ positional coordinate on the trajectory 66.

Figure 13:
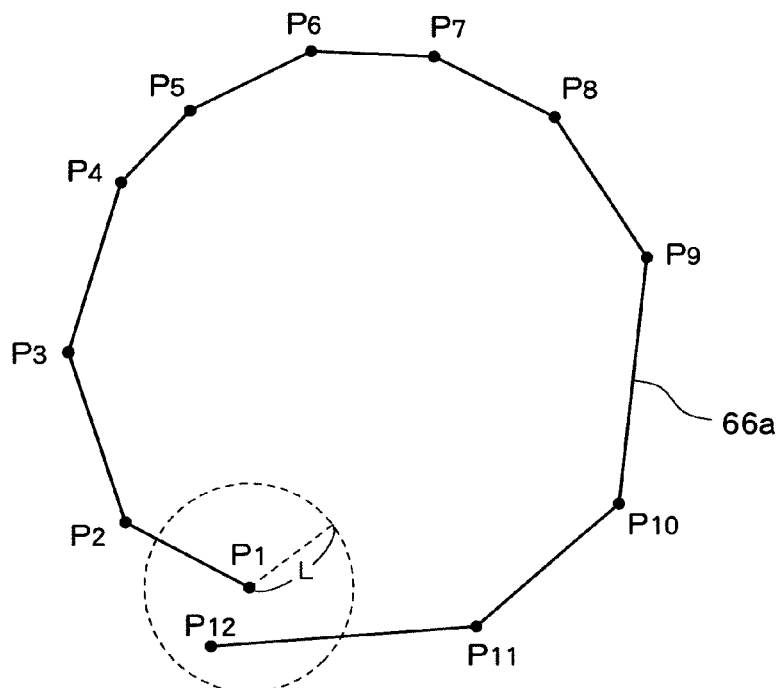
FIG. 13 is a diagram explaining a surrounding condition.
Figure 14:
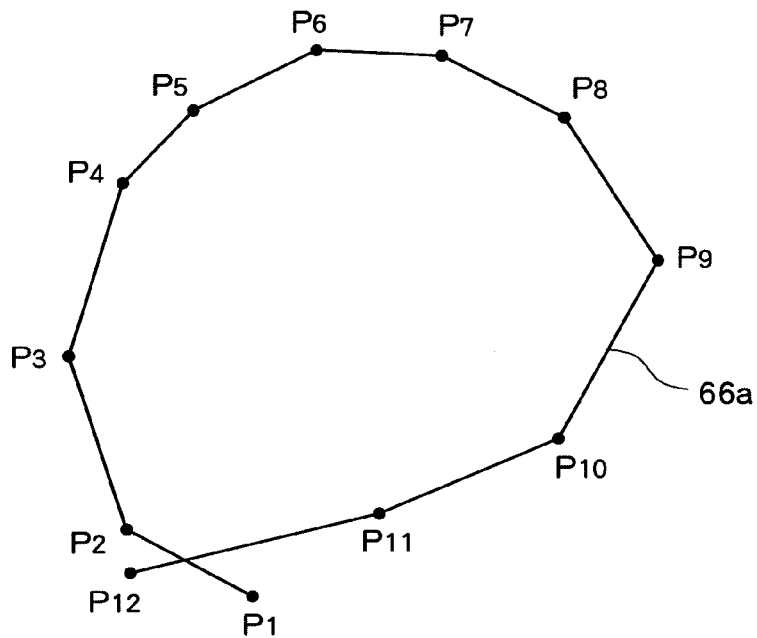
FIG. 14 is a diagram explaining a surrounding condition.

A surrounding condition refers to a condition based on which a certain area is determined as being surrounded by a trajectory portion between the positional coordinate $P_i$ and the positional coordinate $P_{i+j}$. In this embodiment, two kinds of conditions A and B mentioned below are available as surrounding conditions. FIGS. 13 and 14 are diagrams explaining a surrounding condition.

[Condition A]

The straight line distance between the positional coordinate $P_i$ and the positional coordinate $P_{i+j}$ is shorter than a predetermined distance L, and positional coordinates apart from the positional coordinate $P_i$ by a straight line distance equal to or longer than the predetermined distance L are located between the positional coordinates $P_{i+1}$ and $P_{i+j-1}$.

[Condition B]

The straight line from the positional coordinate $P_{i+j-1}$ to the positional coordinate $P_{i+j}$ intersects the straight line from the positional coordinate $P_{i+k}$ to the positional coordinate $P_{i+k+1}$ ($0 \leq k \leq j-2$).

Assume a case, e.g., in which the trajectory portion from the positional coordinate $P_i$ to the positional coordinate $P_{i+j}$ is the trajectory portion 66a from the positional coordinate $P_1$ to the positional coordinate $P_{12}$, as shown in FIG. 13. In this case, as the straight line distance between the positional coordinate $P_1$ and the positional coordinate $P_{12}$ is shorter than a predetermined distance L, and the respective straight line distances from the positional coordinate $P_1$ to the positional coordinates $P_2$ to $P_{11}$ are all equal to or longer than the predetermined distance L, the trajectory portion between the positional coordinate $P_1$ and the positional coordinate $P_{12}$ satisfies the above described condition A.

Also, assume a case, e.g., in which the trajectory portion from the positional coordinate $P_i$ to the positional coordinate $P_{i+j}$ is the trajectory portion 66a from the positional coordinate $P_1$ to the positional coordinate $P_{12}$, as shown in FIG. 14. In this case, as the straight line from the positional coordinate $P_{11}$ to the positional coordinate $P_{12}$ intersects the straight line from the positional coordinate $P_1$ to the positional coordinate $P_2$, the trajectory portion 66a from the positional coordinate $P_1$ to the positional coordinate $P_{12}$ satisfies the above described condition B.

If it is determined that the trajectory portion from the positional coordinate $P_i$ to the positional coordinate $P_{i+j}$ satisfies neither of the surrounding conditions A or B, the game device 10 determines whether or not the positional coordinate $P_{i+j}$ is the end positional coordinate of the trajectory 66 (S108). If the positional coordinate $P_{i+j}$ is not the end positional coordinate of the trajectory 66, the game device 10 adds one to the variable j (S109), and again carries out the process at S102 and thereafter.

Meanwhile, if it is determined that the trajectory portion from the positional coordinate $P_i$ to the positional coordinate $P_{i+j}$ satisfies either of the surrounding conditions A or B, the game device 10 (the surrounding number of times obtaining unit 76) adds one to the variable n (S103). Thereafter, the game device 10 (the selection candidate image determination unit 74) selects one or more player objects 58 surrounded by the trajectory portion from the positional coordinate $P_i$ to the positional coordinate $P_{i+j}$ from among those belonging to the user team (S104). In the above, the IDs of the selected one or more player objects 58 are stored in the main memory 26.

Figure 15:
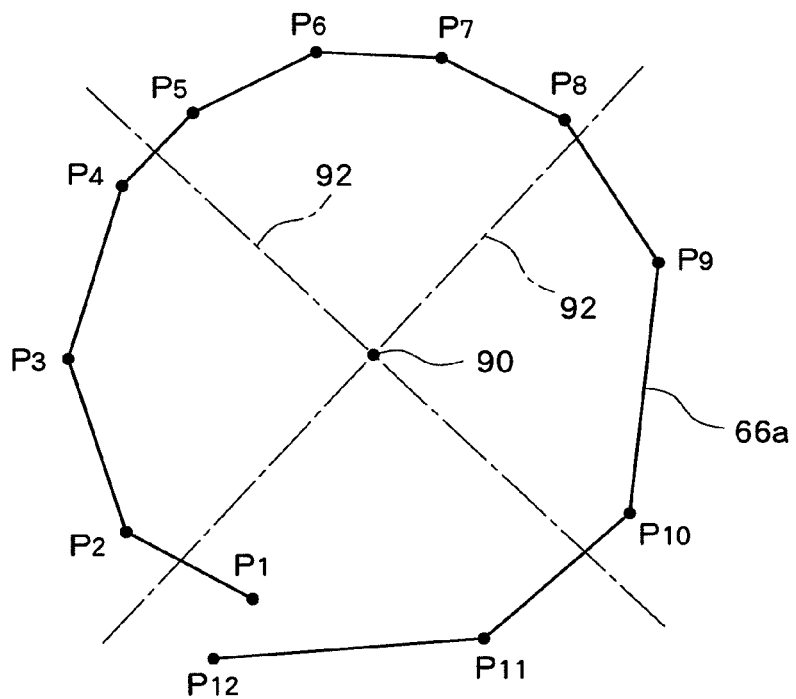
FIG. 15 is a diagram explaining a method for determining one or more player objects surrounded by a trajectory.

Whether or not any player object 58 is surrounded by the trajectory portion from the positional coordinate $P_i$ to the positional coordinate $P_{i+j}$ is determined, e.g., as follows. FIG. 15 is a diagram explaining this determination method. Here, assume a case in which the trajectory portion from the positional coordinate $P_i$ to the positional coordinate $P_{i+j}$ is the trajectory portion 66a from the positional coordinate $P_1$ to the positional coordinate $P_{12}$, as shown in FIG. 15. As shown in FIG. 15, it is determined whether or not all of the plurality of (e.g., two) straight lines 92 which extend passing through the display position 90 of the player object 58 in a predetermined direction intersect the trajectory portion 66a at two points with the display position 90 of the player object 58 located between the two points. If it is determined that all of the plurality of virtual straight lines 92 have such two intersection points with the trajectory portion 66a, it is determined that the player object 58 is surrounded by the trajectory portion 66a.

After the process at S104, the game device 10 determines whether or not the variable n is one (S105). A case with the variable n being one refers to a case in which the trajectory portion from the positional coordinate $P_i$ to the positional coordinate $P_{i+j}$ corresponds to the first-round trajectory portion. In this case, the game device 10 (the selection candidate image determination unit 74) holds the one or more player objects 58 selected at S104 as one or more selection candidate player objects (S106). In the above, the IDs of the one or more player objects 58 selected at S104 are held as one or more selection candidate player object IDs in the main memory 26.

Meanwhile, a case with the variable n not being one refers to a case in which the trajectory portion from the positional coordinate $P_i$ to the positional coordinate $P_{i+j}$ is a second-round or thereafter trajectory portion. In this case, if a player object 58 not selected at S104 is included in the player objects 58 having been already held as selection candidate player objects, the game device 10 (the selection candidate image determination unit 74) excludes that player object 58 from the selection candidate player objects (S107). With this process (S107), in a case where, for example, a player object 58 is surrounded by the first-round trajectory portion but not by the second-round trajectory portion, that player object 58 is excluded from the selection candidate player objects.

After the processes at S106 or 5107, the game device 10 determines whether or not the positional coordinate $P_{i+j}$ is the end positional coordinate of the trajectory 66 (S110). If the positional coordinate $P_{i+j}$ is not the end positional coordinate of the trajectory 66, the game device 10 updates the variable i to i+j and the variable j to one (S113). Thereafter, the game device 10 again carries out the process at S102 and thereafter.

If it is determined at S108 or S110 that the positional coordinate $P_{i+j}$ is the end positional coordinate of the trajectory 66, the game device 10 determines whether or not the variable n is equal to or larger than one (S111). If the variable n is equal to or larger than one, the game device 10 (the image selection unit 78) selects player objects 58 located first to $n^{th}$ closest to the positional coordinate $P_1$ (the start positional coordinate) as selected player objects from among the player objects 58 selected as selection candidate player objects (S113). For example, for the variable n being two, player objects 58 located closest and second closest to the positional coordinate $P_1$ among those selected as selection candidate player objects are selected as selected player objects. In the above, the ID of the player object 58 selected as a selected player object is stored as the selected player object ID in the main memory 26.

The game device 10 (the main game processing unit 80) refers to the selected player object ID stored in the main memory 26 in the case where the opponent team strikes a free kick. That is, the game device 10 moves the player object 58 corresponding to the selected player object ID toward the kicker at the same time as the opponent team strikes a free kick.

Note that a case in which the variable n is determined at S111 as not equal to or larger than one corresponds to a case in which no trajectory 66 surrounding any area is input. In this case, no selected player object is selected.

In the above described game device 10, in a free kick scene for the opponent team, a user can select at least one player object 58 from among the plurality of player objects 58 forming the "wall", and move the selected player object 56 toward the kicker at the same time as the taker of the free kick kicks the ball object 56. In this case, a user can designate the number of player objects 58 to select from among the plurality of player objects 58 forming the "wall", using the number of times the trajectory of a position designated by the controller 32 (the displayed position of the cursor 60) surrounds the plurality of player objects 58 forming the "wall". Also, a user can designate their desired player object 58 to some degree, using the start position of the trajectory surrounding the plurality of player objects 58 forming the "wall". As a result, e.g., when the plurality of player objects 58 forming the "wall" are located close to each other or shown relatively small on the game screen 18a, a user can relatively readily select their desired number of (particularly a plurality of) player objects 58 from among the plurality of player objects 58 forming the "wall".

Note that the present invention is not limited to the above-described embodiment.

Figure 16:
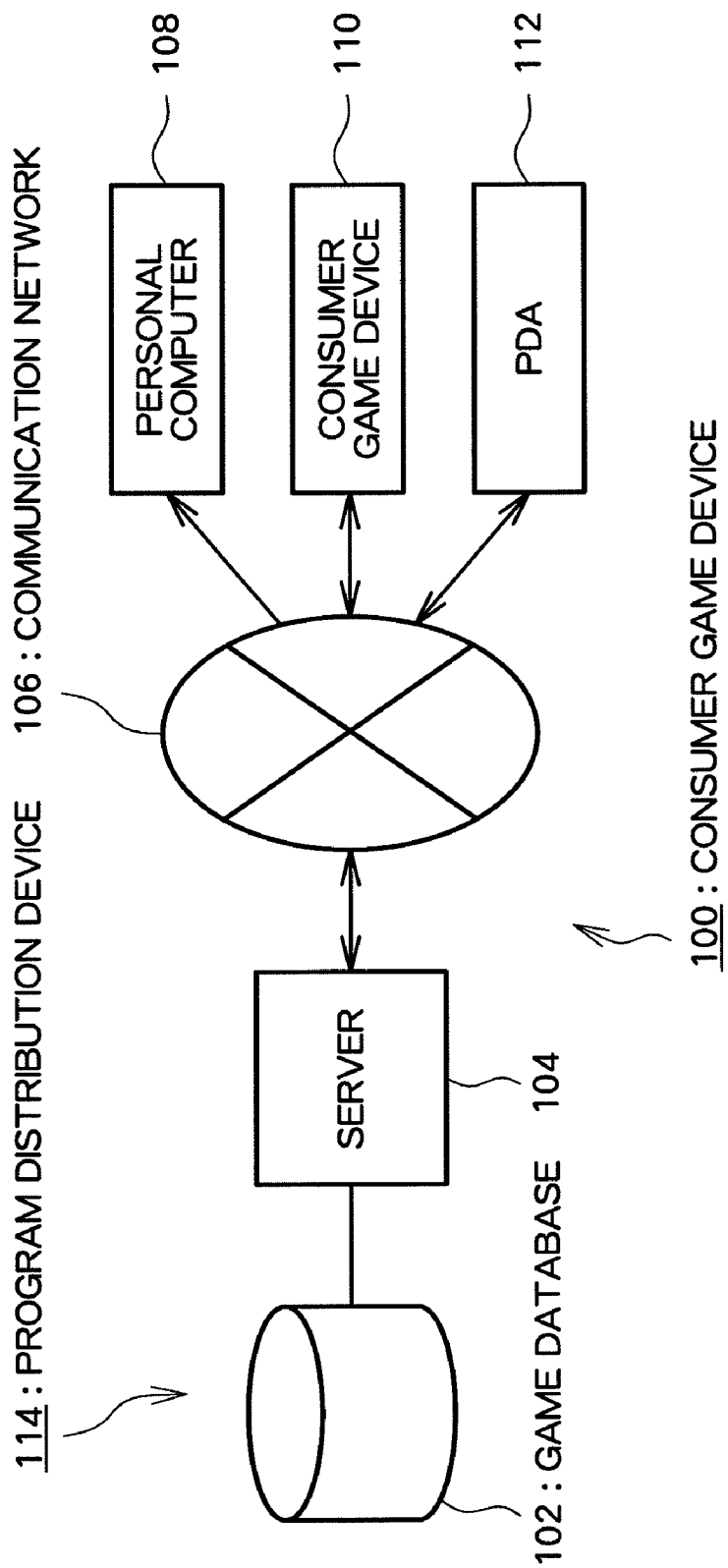
FIG. 16 is a diagram showing an overall structure of a program distribution system according to another embodiment of the present invention.

For example, although a program is provided from the optical disc 25, or an information storage medium, to the consumer game device 11 in the above, a program may be distributed via a communication network to household or the like. FIG. 16 is a diagram showing a complete structure of a program distribution system using a communication network. A program distribution method according to the present invention will be described, referring to FIG. 16. As shown in FIG. 16, the program distribution system 100 comprises a game database 102, a server 104, a communication network 106, a personal computer 108, a consumer game device 110, and a PDA (a personal digital assistant) 112, in which the game database 102 and the server 104 together constitute a program distribution device 114. The communication network 106 comprises, e.g., the Internet and/or a cable television network. In this system, a program having content similar to that stored in the optical disc 25 is stored in the game database (an information storage medium) 102. When a demander requests game distribution, using the personal computer 108, the consumer game device 110, the PDA 112, or the like, the request is sent via the communication network 106 to the server 104. Thereupon, the server 104 reads a program from the game database 102 in response to the game distribution request, and sends the read program to the device having sent the game distribution request, such as the personal computer 108, the consumer game device 110, the PDA 112, or the like. Note that although game distribution is carried out in response to a game distribution request, the server 104 may send a program unidirectionally. In addition, it is not always necessary to distribute a complete program necessary to realize a game at once (collective distribution), and instead, distribution of only a portion of a program necessary for a certain aspect of a game may be applicable (dividing distribution). Game distribution via the communication network 106 in the above described manner makes it easier for a demander to obtain a program.

Also, for example, a game to be carried out in the game device 10 is not limited to a game in which a picture of a three dimensional game space formed by three coordinate elements is shown on the game screen 18a, and a game in which a picture of a two dimensional game space formed by two coordinate elements is displayed on the game screen 18a can be played. That is, a game to be carried out in the game device 10 may be a game in which the positions and the like of a ball character and a player character are managed by means of two coordinate elements.

Also, for example, a game to be carried out in the game device 10 may be a game to be played by two or more users. Further, for example, a game to be played in the game device 10 is not limited to a soccer game. A game to be played in the game device 10 may be a sport game other than a soccer game. A game to be played in the game device 10 may be a game other than a sport game.

Also, for example, the operation input unit 31 may be a touch panel. Also, for example, the operation input unit 31 may be a mouse.

Also, for example, the present invention is applicable to an information processing device other than the game device 10. The present invention is applicable to an information processing device for carrying out a process based on at least one image selected by a user from among a plurality of images displayed on a display screen.

The invention claimed is:

1. An information processing device for carrying out a process based on at least one image selected by a user from among a plurality of images displayed on a display screen, comprising:
   a trajectory obtaining unit that obtains a trajectory of a position on the display screen, the position being designated by the user;
   a determination unit that determines images among the plurality of images, the determined images being surrounded by the trajectory obtained by the trajectory obtaining unit;
   a surrounding number of times obtaining unit that obtains a number of times that the determined images are surrounded by the obtained trajectory; and an image selection unit that selects a number of the images that corresponds to the obtained number of times, from among the images determined to be surrounded by the obtained trajectory.

2. The information processing device according to claim 1, wherein the image selection unit selects the number of the images that corresponds to the obtained number of times from among the determined images surrounded by the obtained trajectory, based on a start position or an end position of the obtained and positions of the images determined by the determination unit as being surrounded by the obtained trajectory.

3. The information processing device according to claim 2, wherein the image selection unit selects the number of the images that corresponds to the obtained number of times from among the determined images surrounded by the obtained trajectory beginning with an image having the shortest distance from the start position or the end position of the obtained trajectory.

4. A control method for controlling an information processing device having a processor for carrying out a process based on at least one image selected by a user from among a plurality of images displayed on a display screen, the control method comprising:

obtaining by the processor a trajectory of a position on the display screen, the position being designated by the user;

determining by the processor images among the plurality of images, the images being surrounded by the obtained trajectory;

obtaining by the processor a number of times the determined images are surrounded by the obtained trajectory; and selecting by the processor a number of images, the number corresponding to the obtained number of times from among the determined images surrounded by the obtained trajectory.

5. A non-transitory computer readable information storage medium storing a program for causing a computer to function as an information processing device for carrying out a process based on at least one image selected by a user from among a plurality of images displayed on a display screen, the program causing the computer to:

obtain a trajectory of a position on the display screen, the position being designated by the user;

determine images from among the plurality of images, the images being surrounded by the obtained trajectory;

obtain a number of times the determined images are surrounded by the obtained trajectory; and select a number of images, the number corresponding to the obtained number of times from among the determined images surrounded by the obtained trajectory.

* * * * *